United States Patent
Ali et al.

(10) Patent No.: US 11,435,491 B2
(45) Date of Patent: Sep. 6, 2022

(54) WAVE VELOCITY DETERMINATION FOR SEISMIC IMAGING

(71) Applicant: Saudi Arabian Oil Company, Dhahran (SA)

(72) Inventors: Mustafa N. Ali, Al Seef (SA); Hongwei Liu, Dhahran (SA); Tong Wang Fei, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 701 days.

(21) Appl. No.: 16/384,368

(22) Filed: Apr. 15, 2019

(65) Prior Publication Data
US 2020/0326441 A1    Oct. 15, 2020

(51) Int. Cl.
*G01V 1/34* (2006.01)
*G01V 1/28* (2006.01)

(52) U.S. Cl.
CPC .............. *G01V 1/345* (2013.01); *G01V 1/286* (2013.01)

(58) Field of Classification Search
CPC . G01V 1/345; G01V 1/34; G01V 1/28; G01V 1/286; G01V 1/362; G01V 1/366; G01V 1/38; G01V 1/808; G01V 1/3817; G01V 1/46; G01V 1/48; G01V 1/52; G01V 2210/67; G01V 2210/66; G01V 2210/62; G01V 2210/622; G01V 2210/6222; G01V 1/306; G01V 1/307; G01L 21/08; G01P 15/0915; G01P 15/097; G01F 23/2965;
(Continued)

(56) References Cited

U.S. PATENT DOCUMENTS

| | | | |
|---|---|---|---|
| 5,771,170 A | 6/1998 | Withers et al. | |
| 6,424,920 B1 * | 7/2002 | Osypov | G01V 1/362 |
| | | | 702/18 |
| 8,472,674 B2 | 6/2013 | Yevskyy et al. | |

(Continued)

FOREIGN PATENT DOCUMENTS

WO    2017040399    3/2017

OTHER PUBLICATIONS

Kumar, Chandan. Parameter inversion for seismic anisotropy, The University of Texas at Austin, Ann Arbor, 2007. ProQuest, https://www.proquest.com/dissertations-theses/parameter-inversion-seismic-anisotropy/docview/304829644/se-2?accountid=14753. (Year: 2007).*

(Continued)

*Primary Examiner* — Daniel R Miller
*Assistant Examiner* — Eric Sebastian Von Wald
(74) *Attorney, Agent, or Firm* — Fish & Richardson P.C.

(57) ABSTRACT

Techniques are described for generating seismic images based on pressure-shear (PS) wave information. Sensor data is generated by through seismic probing of an underground environment. The sensor data can include pressure (P) wave data. The sensor data is analyzed to determine PS wave data present in the sensor data. A CFP gathers spectrum is generated using the P wave velocity. An optimal curve through the CFP gathers spectrum is determined, and PS image(s) of the underground environment are generated by scanning along the optimal curve. The PS image(s) can be provided for presentation through interface(s). The generated PS wave images are correlated with P wave images, and can be plotted on the same coordinate system as P wave images.

20 Claims, 6 Drawing Sheets

(58) Field of Classification Search
CPC .......... G05B 2219/39406; G05B 2219/34134; G05B 2219/37451
See application file for complete search history.

(56) References Cited

U.S. PATENT DOCUMENTS

| | | | |
|---|---|---|---|
| 2005/0128872 A1 | 6/2005 | Valero et al. | |
| 2008/0275649 A1* | 11/2008 | Ozdemir | G01V 1/364 702/14 |
| 2010/0042325 A1* | 2/2010 | Beasley | G01V 1/30 702/11 |
| 2010/0074053 A1 | 3/2010 | Jaiswal et al. | |
| 2011/0082647 A1* | 4/2011 | Edme | G01V 1/366 702/17 |
| 2012/0051177 A1 | 3/2012 | Hardage | |
| 2012/0113750 A1 | 5/2012 | Al-Momin et al. | |
| 2014/0219054 A1 | 8/2014 | Mousa et al. | |
| 2016/0209534 A1* | 7/2016 | Behura | G01V 1/305 |
| 2017/0075008 A1* | 3/2017 | Westerdahl | G01V 1/364 |
| 2017/0176617 A1 | 6/2017 | Colombo et al. | |
| 2018/0059277 A1* | 3/2018 | Bloor | G01V 1/364 |

OTHER PUBLICATIONS

Boschetti et al., "A fractal-based algorithm for detecting first arrivals on seismic traces," Geophysics vol. 61, Jul.-Aug. 1996, 8 pages.

Coppens, "First arrivals picking on common-offset trace collections for automatic estimation of static corrections," presented at the 45th meeting of the European Association of Exploration Geophysicists, Jun. 1983, Geophysical Prospecting, vol. 33, Dec. 1985, 20 pages.

Murat and Rudman, "Automated first arrival picking: A neural network approach," Geophysical Prospecting, vol. 40, Aug. 1992, 18 pages.

Peraldi and Clement, "Digital processing of refraction data: Study of first arrivals," presented at the 33rd Meeting of the European Association of Exploration Geophysicists, Jun. 1971, Geophysical Prospecting, vol. 20, Sep. 1972, 20 pages.

Sabbione and Velis, "Automatic first-breaks picking: New strategies and algorithms," Geophysics vol. 75, No. 4, Jul.-Aug. 2010, 10 pages.

Stovas and Alkhalifah, "Analytical approximations of diving-wave imaging in constant-gradient medium," Geophysics Prospecting, vol. 79, No. 4, Jul.-Aug. 2014, 10 pages.

Keho et al., "Revisiting automatic first arrival picking for large 3D land surveys," 79th Society of Exploration Geophysicists International Exposition and Annual Meeting, Houston, Texas, Oct. 25-30, 2009, 5 pages.

PCT International Search Report and Written Opinion in International Appln. No. PCT/US2020/028066, dated Aug. 7, 2020, 16 pages.

GCC Examination Report in GCC Appln. No. GC 2020-39542, dated Aug. 15, 2021, 5 pages.

Chen et al., "Paper automated time-domain transform of converted waves by prestack double-parameter scanning," Journal of Geophysics Publishing, Jul. 2013, 10(4): 1-11.

Chen et al., "PS-wave anisotropic migration velocity analysis based on simplified moveout equation," International Geophysical Conference, Apr. 17-20, 2017, Qingdao, China, pp. 456-459.

Dai et al., "A revised two-parameter moveout equation of PS converted waves in VTI media," SEG Technical Program Expanded Abstracts, Jan. 2010, pp. 248-252.

Liu et al., "CFP based shear wave velocity model building using converted waves," SEG Technical Program Expanded Abstracts, Apr. 2019, 15:2679-2683.

Lu et al., "Joint velocity updating for anisotropic PP and PS prestack time migration based on hyperbolic correction of nonhyperbolic moveout," Journal of Geophysics and Engineers, Institute of Physics Publishing, Apr. 2018, 15(4): 1171-1186.

PCT International Search Report and Written Opinion in International Appln. No. PCT/US2020/028069, dated Jul. 22, 2020, 16 pages.

\* cited by examiner

WAVE VELOCITY DETERMINATION FOR SEISMIC IMAGING

BACKGROUND

In resource extraction operations and other scenarios, operators may attempt to understand the underground layers of rock in the vicinity of their operations. Seismic images can be generated using data that is collected from various probing elastic waves. The images can be created based on the wave echoes generated by different rock properties. In the oil and gas extraction industry, seismic images are typically developed using data that describes pressure seismic waves, also described as P waves.

SUMMARY

Implementations of the present disclosure are generally directed to seismic imaging to generate images of underground layers of materials. More particularly, implementations of the present disclosure are directed to techniques for determining velocities of shear waves (S waves) and using the determined velocities to generate seismic images through the conversion of pressure waves (P waves) to S waves.

In general, aspects of the subject matter described in this specification can be embodied in a method that performs various operations. The operations include receiving sensor data that is generated by one or more sensors through seismic probing of an underground environment. The sensor data can include P wave data. The sensor data can be analyzed to determine pressure-shear (PS) wave data that is present in the sensor data. APS wave includes a P wave as an incident wave and an S wave as a reflected wave. A common focus point (CFP) gather spectrum is generated based on the PS wave data. An optimal curve through at least a portion of the CFP gather spectrum is determined, and one or more images of the underground environment are generated by scanning along the optimal curve. The one or more images can be provided for presentation through an interface.

These and other implementations can each optionally include one or more of the following aspects.

In some implementations, the optimal curve is determined as a curve that passes through the most energetic portions of the CFP gather spectrum.

In some implementations, the CFP gather spectrum is determined based on a ratio of P wave velocity to S wave velocity.

In some implementations, the one or more images include one or more PS wave images.

In some implementations, the one or more PS wave images are correlated with one or more P wave images.

In some implementations, generating the CFP gather spectrum employs P wave velocity.

In some implementations, scanning along the optimal curve includes scanning along a single parameter that is a ratio of P wave velocity to S wave velocity.

Other implementations of any of the aspects include corresponding systems, apparatus, or computer programs that are configured to perform the operations of the methods. The present disclosure also provides a computer-readable storage medium coupled to one or more processors and having instructions stored on the medium. When executed by the one or more processors, the instructions cause the one or more processors to perform operations in accordance with implementations of the methods provided in this disclosure.

The present disclosure further provides a system for implementing the methods. The system includes one or more processors and a computer-readable storage medium coupled to the one or more processors. Instructions are stored on the medium. The instructions are executable by the one or more processors. When executed the instructions cause the one or more processors to perform operations in accordance with implementations.

Images based on P wave data have traditionally been useful for resource discovery and extraction in the oil and gas industry. However, the use of P wave images alone has proven inadequate to understand complexly structured oil and gas reservoirs. In many instances, the acquisition of P wave seismic data also produces PS wave data. APS wave is a wave in which the incident wave is a P wave and the reflected wave is an S wave. PS wave data typically provides a strong signal and is widely available, particularly when ocean bottom nodes (OBNs) are used to acquire marine data. Traditionally, PS wave data has not been utilized for seismic imaging due to a lack of techniques that can be used to generate S wave velocity models to produce PS wave images. Further, it has traditionally been challenging to properly correlate P images and PS images, for example to identify image pixels that come from the same subsurface locations in the two images. Implementations described in this disclosure provide techniques for generating PS wave images and for correlating P and PS wave images. Because the generated PS wave images are presented in the same coordinate system as the P wave images, the PS wave images are readily usable for prospecting and reservoir characterization.

Previous techniques for producing PS images relied on determining the S wave velocity in the common converted point (CCP) domain, which is not a physical domain. Determining velocity in the physical domain is achieved through use of one source and multiple receivers. Alternatively, determining velocity in the physical domain is achieved through use of one receiver and multiple sources. The CCP domain does not provide an S wave velocity model that is sufficiently accurate for image generation. The implementations described in this disclosure use a CFP domain that simulates an experiment performed in the physical domain, and which produces more accurate S wave velocity model than that produced by previous techniques.

It is appreciated that implementations in accordance with the present disclosure can include any combination of the aspects and features described in this disclosure. Implementations in accordance with the present disclosure are not limited to the combinations of aspects and features specifically described in this disclosure, but also include any other appropriate combinations of the aspects and features provided.

The details of one or more implementations of the present disclosure are set forth in the accompanying drawings and the description. Other features and advantages of the present disclosure will be apparent from the description and drawings, and from the claims.

DETAILED DESCRIPTION

Figure 1:
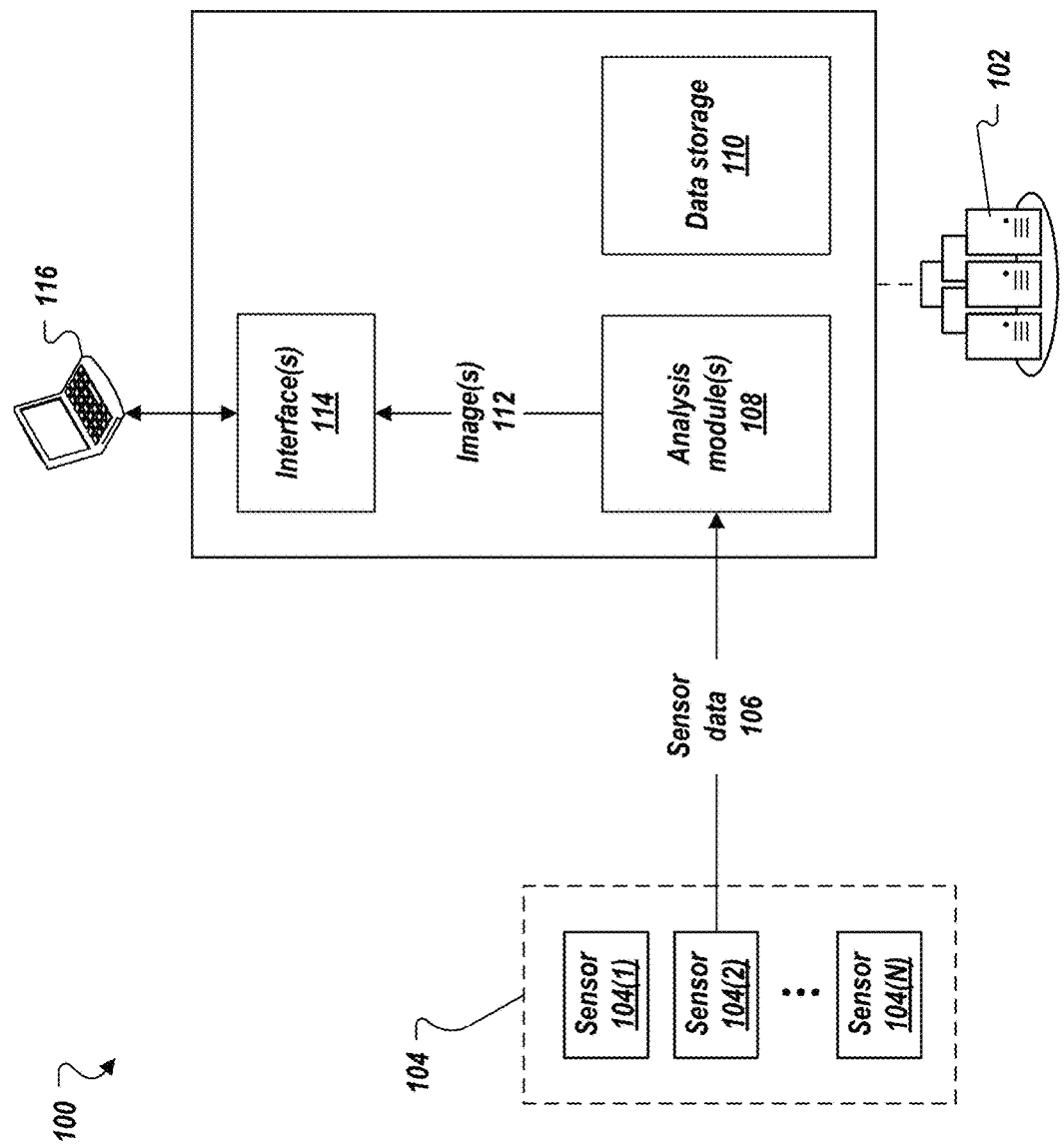
FIG. 1 shows an example system for seismic image generation, according to implementations of the present disclosure.

Implementations of the present disclosure are directed to techniques for determining velocities of S waves and using the determined velocities to generate seismic images through the conversion of P waves to S waves. Implementations employ a closed-loop workflow as a sequence of procedures for estimating S wave velocities. Seismic images of an underground environment are generated using primary compressional P waves converted to S waves. The PS wave images produced by the workflow are correlated with the P wave images, such that both the PS wave and P wave images are produced in the same coordinate system. The P wave and PS wave images provide cross-validation and estimation of underground rock and fluid properties. In some implementations, the workflow includes operations for decoupling the S wave information by generating CFP gathers through application of the P wave velocity model to the PS seismic data. A CFP gather generation is a technique in which focusing in a detection operation is applied to the seismic data. Each common source gather can be transformed into a single trace for the subsurface grid point under consideration (as in Fresnel stacking). Each trace can be placed at the location of the associated source. The result that is obtained after this focusing is referred to as the CFP gather. The workflow can also include operations to select an optimal $v_p/v_s$ ratio curve within a $v_p/v_s$ ratio spectrum, where $v_p$ refers to P wave velocity, and $v_s$ refers to S wave velocity. The S wave velocity can be computed based on the selected optimal ratio. The S wave velocity can be used for generating the PS wave images. The use of the S wave velocity ensures that the PS images are correlated to P wave images.

The CFP gathers preserve wave information. The CFP gathers can be produced based on the P wave velocity. The S velocity is independent from the CFP gathers. The S velocity can be used to estimate S wave velocity and generate PS wave images. The $v_p/v_s$ ratio varies in a narrow range, limiting the possibilities for selecting the optimal ratio curve. Moreover, the ratio of the average velocity and stacking velocity between P waves and S waves are approximately the same. These characteristics have the effect of limiting the magnitude of the error that may be introduced through selection of the optimal ratio curve from the data. Selecting the optimal ratio curve includes determining the curve that passes through the most energetic zones in the $v_p/v_s$ ratio spectrum. The most energetic points from each event are selected from a range that varies from the points associated with a shallow depth to the points associated with a deeper depth. The optimal ratio curve is then determined by interpolating these points. The selection of the curve that passes through the most energetic zones in the spectrum is equivalent to picking an optimal ratio curve. The $v_p/v_s$ ratio can be used to generate a stacking curve in the CFP gather such that when the optimal ratio is chosen the stacking energy is the strongest.

In a PS wave, the incident wave is a P wave and the reflected wave is an S wave. The input data includes both P wave and S wave data, and no wave is filtered out. Because the horizontal component is used as input, the S wave component can have a greater magnitude than the P wave component.

After the optimal ratio curve is determined, the workflow can scan along the determined curve according to a single parameter, the $v_p/v_s$ ratio. Traditional methods require two parameters: 1) the $v_p/v_s$ ratio or $v_s$, and 2) the conversion location. These two parameters are dependent on each other. The conversion location is the seismic interface where the input P wave is converted to a reflected S wave. Thus, traditional methods employ an iterative process to solve this coupling problem. In some implementations, the $v_p/v_s$ ratio is the one parameter to be determined. To determine two parameters as in the traditional techniques, multiple iterations are performed to estimate the two parameters. In the implementations of this disclosure, one iteration can be performed to determine the $v_p/v_s$ ratio parameter as the single parameter.

FIG. 1 shows an example system 100 for seismic image generation, according to implementations of the present disclosure. The system 100 includes one or more analysis computing devices 102. A number (N) of sensors 104 may be arranged to generate sensor data 106 through seismic probing of an underground environment. In some instances, the sensor data 106 is collected during or prior to a drilling operation. The sensor data 106 can be communicated to the device(s) 102 and received by one or more analysis modules 108 executing on the device(s) 102. In some implementations, the sensor data 106 can be stored in data storage 110 and accessed from the data storage 110 by the analysis module(s) 108. The data storage 110 can be local to the device(s) 102, as shown in the example of FIG. 1. Alternatively, the data storage 110 can be remote from the device(s) 102 and accessible over one or more networks. The analysis module(s) 108 can analyze the sensor data 106 to generate seismic image(s) 112 (for example, PS wave images) using the techniques described in this disclosure. The image(s) 112 can be output through one or more interface(s) 114 for presentation on output computing device(s) 116. In some instances, the image(s) 112 are stored in the data storage 110. The interface(s) 114 can retrieve the image(s) 112 from the data storage 110 and display the image(s) 112.

Figure 2:
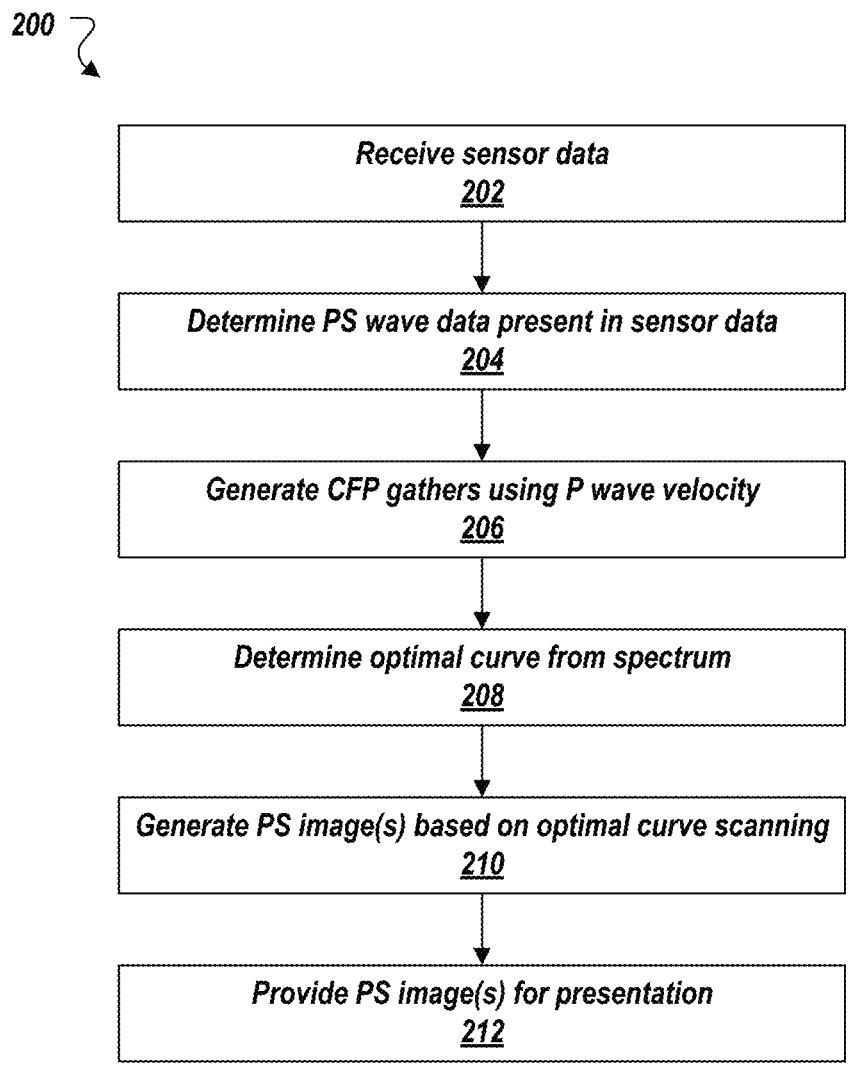
FIG. 2 shows a flow diagram of an example process for generating seismic image(s), according to implementations of the present disclosure.

FIG. 2 shows flow diagram 200 of an example process for generating seismic image(s) 112, according to implementations of the present disclosure. Operations of the process can be performed by the analysis module(s) 108 or other software module(s) executing on the analysis device(s) 102, or elsewhere.

The sensor data 106 is received (202) and analyzed to determine (204) the (pre-stack) PS wave data present in the sensor data 106. The CFP gathers spectrum is generated (206) using $v_p$. The optimal curve is determined (208) based on the CFP gathers spectrum. The PS image(s) are generated (210) by scanning along the optimal curve. The PS image(s) are provided (212) for presentation through the interface(s) 114.

The process shown in FIG. 2 (also described as the workflow) operates to generate PS wave images that are correlated with P wave images. This correlation means that the PS wave images can be plotted on a same system of coordinates as the P wave images. Because the resulting PS wave images are presented in the same coordinate system as P wave images, the PS wave images are readily usable by viewers for prospecting and reservoir characterization purposes.

In the workflow, the raw PS wave data in the sensor data can be partially stacked according to $v_p$ while preserving the kinematic information of S waves. The partial stacking technique is referred to as CFP stacking. In the workflow, the CFP stacking is used for extracting $v_s$ and for correlating the time shifts for matching P and PS wave images. Through this process, the sources at the surface are effectively redatumed to specific grid points at deeper horizons. This redatuming simulates a seismic experiment in which the S waves source is located at a deep grid point in the Earth and the S waves receivers are positioned at the surface. A common $v_p/v_s$ ratio is determined via one parameter scanning. There can be two different ratios: the ratio for the average Earth layers velocity and the ratio for the stacking velocity. Implementations employ the common $v_p/v_s$ ratio to approximate the two types of ratios. Reducing the two unknown ratios to one provides for more efficient scanning and selection of the optimal curve. The errors that may be introduced by this single-ratio assumption are minimized by the picking of the optimal ratio. Moreover, scanning the $v_p/v_s$ ratio provides advantages over searching for $v_s$ directly because the ratio spans a smaller range than the $v_s$.

In some implementations, the generation of the CFP gathers for the PS waves is performed according to Equation 1. Assuming the P wave velocity $v_p(t_0)$ is known, $t_{0p}$ denotes the two-way travel time. The P wave velocity can also be described as the P wave stacking velocity. The CFP gathers $C_{fp}$ are calculated according to Equation 1. In Equation 1, $x_f$ is the surface location of the focus point, $\delta t_p$ denotes the one-way travel time from $x_s$ location $(t_{0p}, x_f)$. The input data is denoted by $d(t, x_s, x_g)$, where $x_s$ and $x_g$ denote the shot and receiver locations respectively, and t denotes time.

$$C_{fp}(t_{0p}, x_f, x_g) = \sum_{x_s} d(t_{0p} + \delta t_p(x_s, x_f, t_{0p}), x_s, x_g) \quad \text{Equation 1}$$

The one-way travel time $\delta t_p$ can be calculated according to Equation 2.

$$\delta t_p = \sqrt{\frac{t_{0p}^2}{4} + (x_s - x_f)^2 / v_p^2(t_{0p})} \quad \text{Equation 2}$$

Figure 3:
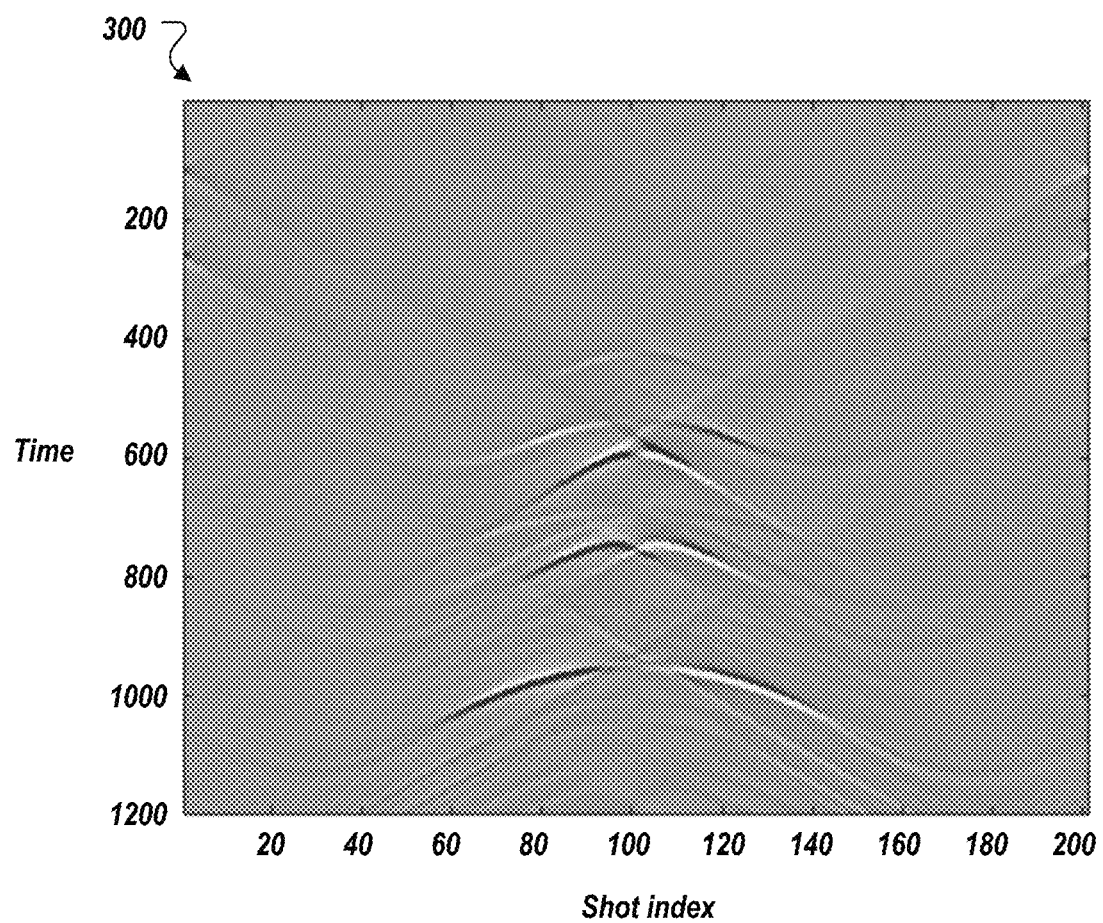
FIG. 3 shows an example of spectrum data, according to implementations of the present disclosure.

The summation in Equation 1 can be performed using only the P wave stacking velocity. FIG. 3 shows an example of stacked images of the CFP gathers.

FIG. 3 shows an example graph 300 of a CFP gather spectrum that can be analyzed as part of the workflow, according to implementations of the present disclosure. The CFP gather spectrum can be generated using synthetic PS wave data as described with reference to FIG. 2. In FIG. 3, the shot index is plotted on the horizontal axis and time is plotted on the vertical axis.

In the CFP gather spectrum, the one-way S wave travel times are preserved. In other words, after applying the P wave focusing operator, the generated CFP gathers represent the one-way S wave travel times. The S wave one-way travel time is the travel time from the point $(t_{0p}, x_f)$ to $x_g$. In other words, the S wave one-way travel time is the S wave travel time from an underground source (for example, an exploding source) to the receiver location $x_g$.

Figure 4A:
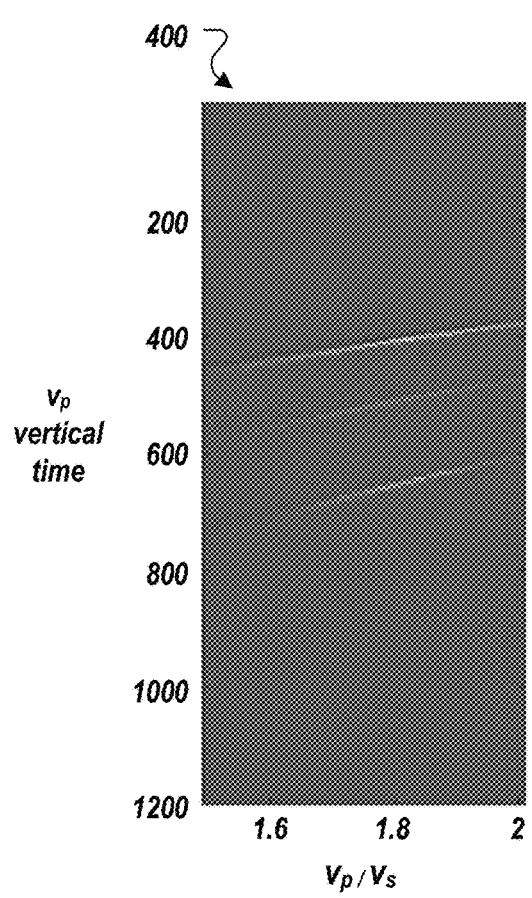
FIGS. 4A and 4B show example graphs, according to implementations of the present disclosure.

An example $v_p/v_s$ ratio spectrum is shown in FIG. 4A. In some implementations, the spectrum S is generated according to Equation 3.

$$S(t_{0p}, \gamma, x_f) = \Sigma_{x_g} C_{fp}(t_{0p}\gamma(t_{0p}) + \delta t_s, x_f, x_g) \quad \text{Equation 3}$$

The time shift $\delta t_s$ can be calculated according to Equation 4.

$$\delta t_s = \sqrt{\frac{t_{0p}^2 \gamma^2}{4} + \gamma^2 (x_s - x_f)^2 / (v_p(t_{0p}))^2} \quad \text{Equation 4}$$

Figure 4B:
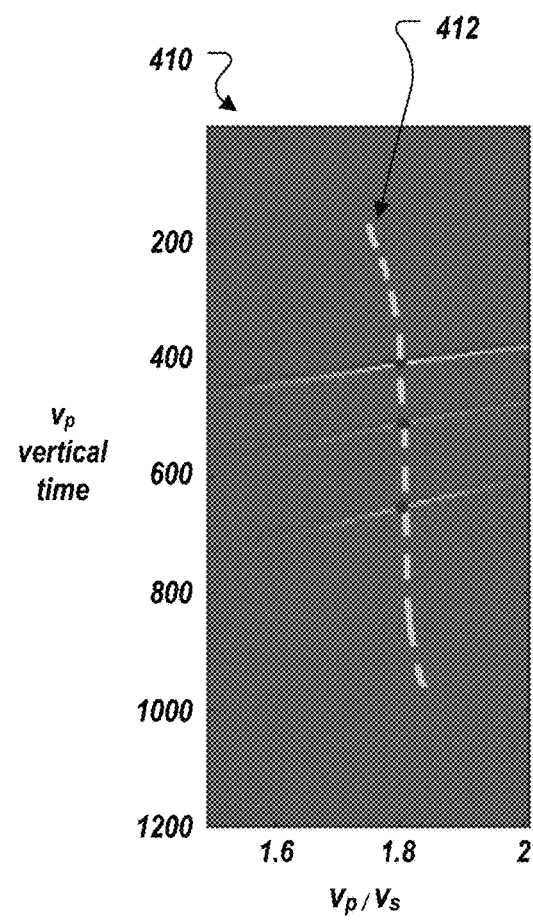

In Equations 3 and 4, the $\gamma$ parameter denotes the ratio of $v_p$ to $v_s$. The $\gamma$ parameter can have a range of scanning trail values. An example of the resulting ratio spectrum at a location $x_f$ is shown in FIGS. 4A and 4B.

FIG. 4A shows an example graph 400 of the ratio of $v_p$ to $v_s$. FIG. 4B shows an example graph 410 of the ratio of $v_p$ to $v_s$, in which the optimal curve 412 has been selected as described with reference to FIG. 2. FIGS. 4A and 4B show the $v_p/v_s$ ratio plotted on the horizontal axis, relative to the $v_p$ vertical time plotted on the vertical axis.

Although the $\gamma$ in Equation 4 could be moved out of the square root, leaving it inside the square root illustrates two effects of $\gamma$. First, $\gamma$ shifts the vertical time $t_{0p}$ to S wave zero time, $t_{0s}=t_{0p}\gamma$. Second, dividing by the parameter $\gamma$ transforms a P wave velocity to an S wave velocity. Implementations employ $\gamma$ as the one parameter to provide these two effects. Although this approximation can be more precisely accurate in some instances, such as instances in which every layer shares the same $v_p/v_s$ ratio, its final validation may be verified by multiple examples. As shown in FIG. 4B, a curve $\gamma^*(t_{0p})$ is selected that passes though the most energetic zones in the spectrum. By incorporating the selected $\gamma^*(t_{0p})$ into Equation 3, a final PS image I can be obtained according to Equation 5.

$$I(t_{0p}, x_f) = S(t_{0p}, \gamma^*(t_{0p}), x_f) \quad \text{Equation 5}$$

This image can be described as a pre-stack migrated PS wave image or a double focusing image. An example of the image is shown in FIGS. 5A and 5B.

Figure 5A:
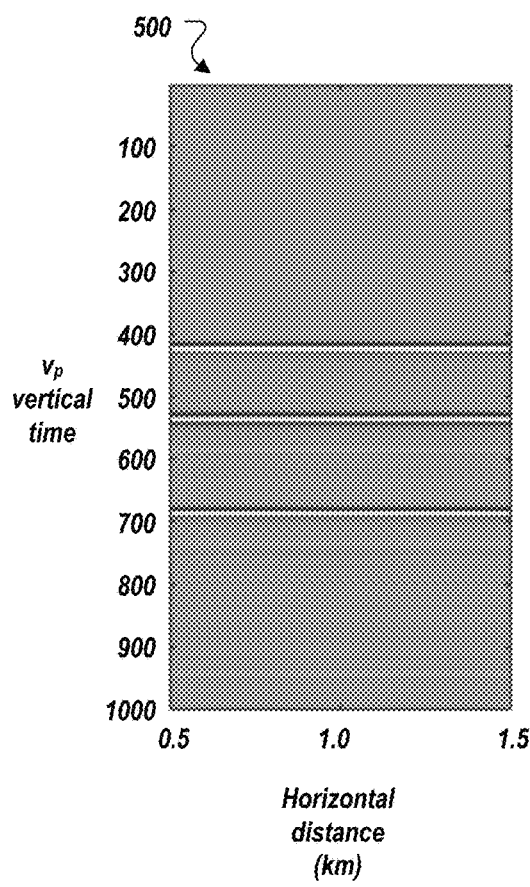
FIGS. 5A and 5B show examples of generated images, according to implementations of the present disclosure.
Figure 5B:
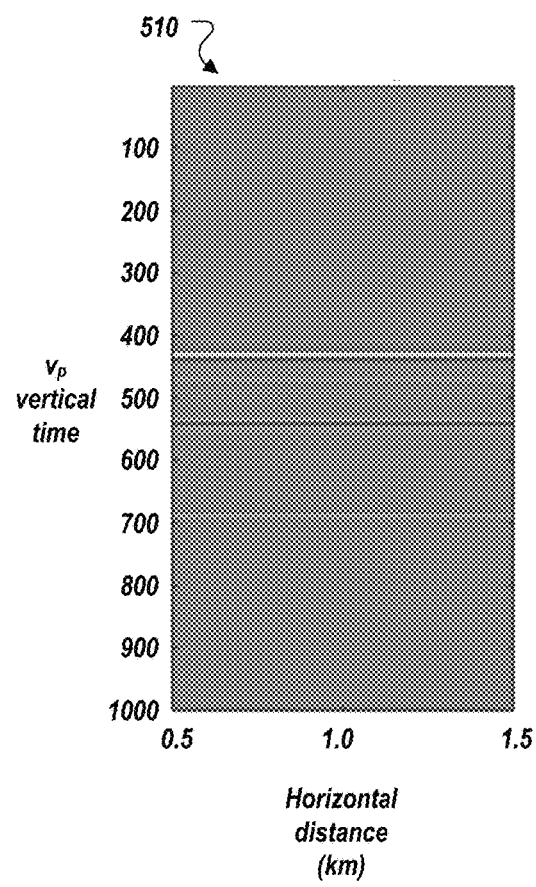

FIG. 5A shows an example 500 of a generated P-P image. FIG. 5B shows an example 510 of a generated P-SV image. In these examples, $v_p$ vertical time is plotted on the vertical axis and horizontal distance (in kilometers) is plotted on the horizontal axis. In the P-P image, the input data is P wave and the reflected data is also P wave. In the P-SV image, the input data is P wave and the reflected data is SV (shear) converted wave.

Figure 6:
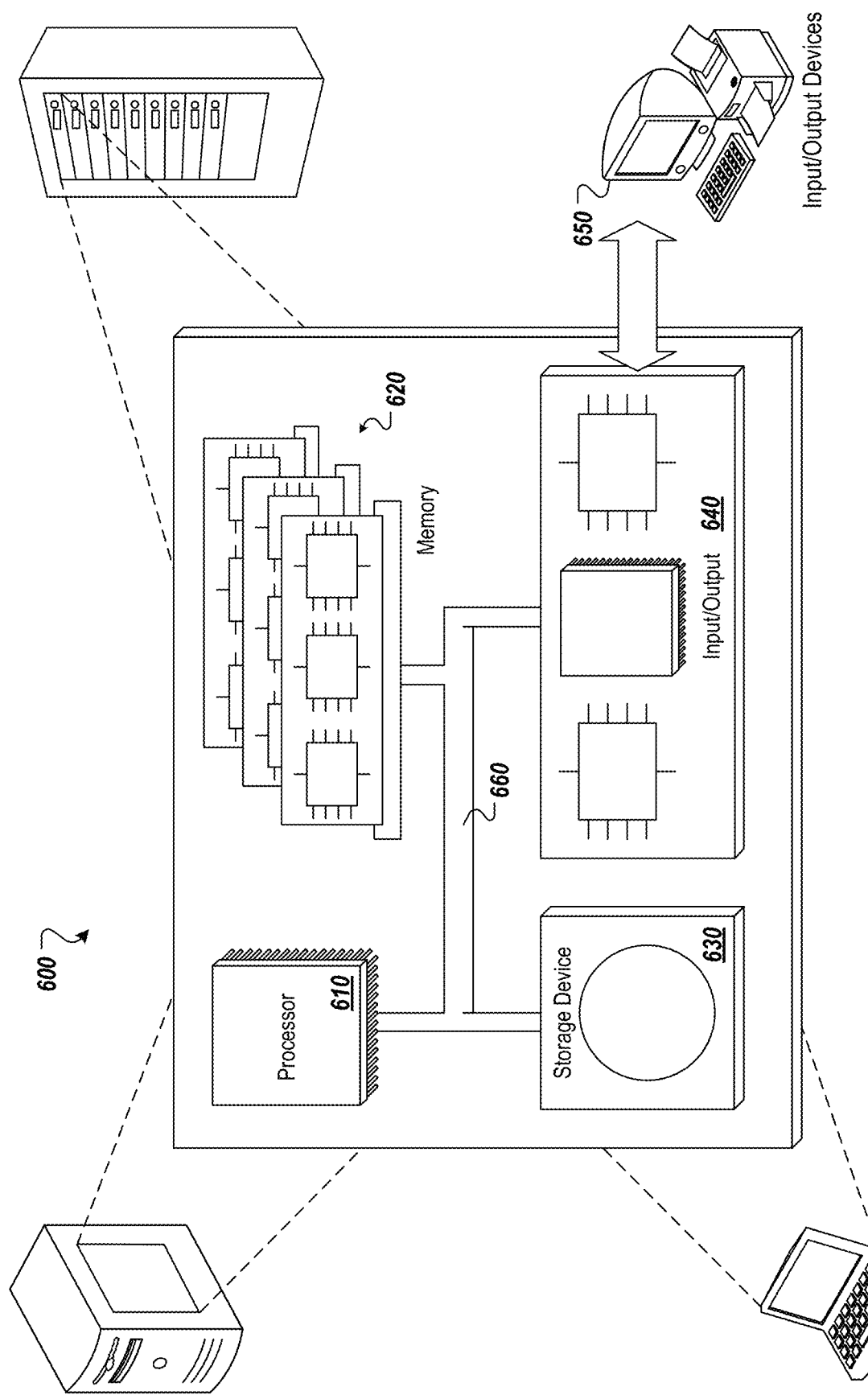
FIG. 6 depicts an example computing system, according to implementations of the present disclosure.

FIG. 6 depicts an example computing system, according to implementations of the present disclosure. The system 600 may be used for any of the operations described with respect to the various implementations discussed in this disclosure. For example, the system 600 may be included, at least in part, in one or more of the computing device(s) 102, and other computing device(s) or system(s) described in this disclosure. The system 600 may include one or more processors 610, a memory 620, one or more storage devices 630, and one or more input/output (I/O) devices 650 controllable via one or more I/O interfaces 640. The various components 610, 620, 630, 640, or 650 may be interconnected via at least one system bus 660. The bus 660 may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. For example, the processor(s) 610 execute instructions for the various software module(s) described in this disclosure. The processor(s) 610 may include hardware-based processor(s), each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory (ROM), random access memory (RAM), or both. In some examples, the memory 620 is employed as active or physical memory by one or more executing software modules.

The storage device(s) 630 may be configured to provide (for example, persistent) mass storage for the system 600. In some implementations, the storage device(s) 630 include one or more computer-readable media. For example, the storage device(s) 630 include one or more of a floppy disk device, a hard disk device, an optical disk device, and a tape device. The storage device(s) 630 may include ROM, RAM, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, and a mechanical computer storage medium. The CRSM may provide storage of computer-readable instructions describing data structures, processes, applications, programs, other modules, or other data for the operation of the system 600. In some implementations, the CRSM provides storage of computer-readable instructions or other information in a non-transitory format. The CRSM may be incorporated into the system 600 or may be external with respect to the system 600. The CRSM may include ROM, RAM, or both. One or more CRSM for tangibly embodying computer program instructions and data may include any type of non-volatile memory, including but not limited to semiconductor memory devices, such as EPROM, EEPROM, and flash memory devices; magnetic disks, such as internal hard disks and removable disks; magneto-optical disks; and CD-ROM and DVD-ROM disks. In some examples, the processor(s) 610 and the memory 620 are supplemented by, or incorporated into, one or more application-specific integrated circuits (ASICs).

The system 600 may include one or more I/O devices 650. The I/O device(s) 650 may include one or more input devices, such as a keyboard, a mouse, a pen, a game controller, a touch input device, an audio input device (for example, a microphone), a gestural input device, a haptic input device, or an image or video capture device (for example, a camera). In some examples, the I/O device(s) 650 include one or more output devices, such as a display, LED(s), an audio output device (for example, a speaker), a printer, or a haptic output device. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 comply with a version of the RS-232 standard for serial ports, or with a version of the Institute of Electrical and Electronics Engineers (IEEE) 1284 standard for parallel ports. As another example, the I/O interface(s) 640 are configured to provide a connection over Universal Serial Bus (USB) or Ethernet. In some examples, the I/O interface(s) 640 are configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more communication networks using any network protocol.

Computing devices of the system 600 may communicate with one another, or with other computing devices, using one or more communication networks. Such communication networks may include public networks (for example, the Internet), private networks (for example, an institutional or personal intranet), or any combination of private and public networks. The communication networks may include any type of wired or wireless network, including but not limited to local area networks (LANs), wide area networks (WANs), wireless WANs (WWANs), wireless LANs (WLANs), and mobile communications networks (for example, 3G, 4G, Edge). In some implementations, the communications between computing devices are encrypted or otherwise secured. For example, communications employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include but are not limited to a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (for example, a cloud computing device), a microcomputer, a system on a chip (SoC), and a system in a package (SiP). Although some examples in this disclosure describe computing device(s) as physical device(s), implementations are not so limited. In some examples, a computing device includes one or more of a virtual computing environment, a hypervisor, an emulation, or a virtual machine executing on one or more physical computing devices. In some examples, two or more computing devices are organized as a cluster, cloud, form, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, in other words, one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to a receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit for use in a computing environment. A computer program does not necessarily correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example, an FPGA (field programmable gate array) or an ASIC (application specific integrated circuit).

Processors for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, for example, magnetic, magneto optical disks, or optical disks. However, a computer need not have such devices. Moreover, a computer may be embedded in another device, for example, a mobile telephone, a personal digital assistant (PDA), a mobile audio player, a Global Positioning System (GPS) receiver, to name just a few. Computer readable media for storing computer program instructions and data include all forms of non-volatile memory, media and memory devices, including by way of example semiconductor memory devices, for example, erasable programmable ROM (EPROM), electrically erasable programmable ROM (EEPROM), and flash memory devices; magnetic disks, for example, internal hard disks or removable disks; magneto optical disks; and compact disc (CD) ROM and digital versatile disc (DVD) ROM. The processor and the memory may be supplemented by, or incorporated in, special purpose logic circuitry.

To provide for interaction with a user, implementations may be realized on a computer having a display device, for example, a cathode ray tube (CRT) or liquid crystal display (LCD) monitor, for displaying information to the user and a keyboard and a pointing device, for example, a mouse or a trackball that are usable to provide input to the computer. Other kinds of devices may be used to provide for interaction with a user as well; for example, feedback provided to the user may be any appropriate form of sensory feedback, for example, visual feedback, auditory feedback, or tactile feedback; and input from the user may be received in any appropriate form, including acoustic, speech, or tactile input.

Implementations may be realized in a computing system that includes a back end component, for example, as a data server. Implementations may be realized in a computing system that includes a middleware component, for example, an application server. Implementations may be realized in a computing system that includes a front end component, for example, a client computer having a graphical user interface or a web browser through which a user may interact with an implementation. Implementations may include any appropriate combination of back end, middleware, and front end components. The components of the system may be interconnected by any appropriate form or medium of digital data communication, for example, a communication network. Examples of communication networks include a local area network ("LAN") and a wide area network ("WAN"), for example, the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any sub-combination. Moreover, although features may be described in this disclosure as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order to achieve desirable results. Moreover, the depiction of particular operations in the drawings should not be understood as requiring that all of the illustrated operations be performed to achieve desirable results. In certain circumstances, multitasking and parallel processing may be advantageous. The separation of various system components in the implementations described in this disclosure should not be understood as requiring such separation in all implementations. Further, it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown in this disclosure may be used, with steps re-ordered, added, or removed. Accordingly, other implementations are within the scope of the following claims.

The invention claimed is:

1. A computer-implemented method executed by at least one processor, the method comprising:
    receiving, by the at least one processor, sensor data generated by one or more sensors through seismic probing of an underground environment, the sensor data including pressure (P) wave data;
    determining, by the at least one processor, pressure-shear (PS) wave data present in the sensor data, wherein a PS wave includes a P wave as an incident wave and a shear (S) wave as a reflected wave;
    generating, by the at least one processor, a common focus point (CFP) ratio spectrum based on a ratio of P wave velocity to S wave velocity;
    determining, by the at least one processor, an optimal ratio curve through at least a portion of the CFP ratio spectrum;
    generating, by the at least one processor, one or more images of the underground environment by scanning along the optimal ratio curve; and
    providing, by the at least one processor, the one or more images for presentation through an interface.

2. The method of claim 1, wherein the optimal curve is determined as a curve that passes through the most energetic portions of the CFP gather spectrum.

3. The method of claim 1, wherein the CFP gather spectrum is determined based on a ratio of P wave velocity to S wave velocity.

4. The method of claim 1, wherein the one or more images include one or more PS wave images.

5. The method of claim 4, wherein the one or more PS wave images are correlated with one or more P wave images.

6. The method of claim 1, where generating the CFP gather spectrum employs P wave velocity.

7. The method of claim 1, wherein scanning along the optimal curve includes scanning along a single parameter that is a ratio of P wave velocity to S wave velocity.

8. A system comprising:
    at least one processor; and
    a memory communicatively coupled to the at least one processor, the memory storing instructions that when executed cause the at least one processor to perform operations comprising:
        receiving sensor data generated by one or more sensors through seismic probing of an underground environment, the sensor data including pressure (P) wave data;
        determining pressure-shear (PS) wave data present in the sensor data, wherein a PS wave includes a P wave as an incident wave and a shear (S) wave as a reflected wave;
        generating a common focus point (CFP) ratio spectrum based on a ratio of P wave velocity to S wave velocity;
        determining an optimal ratio curve through at least a portion of the CFP ratio spectrum;
        generating, by the at least one processor, one or more images of the underground environment by scanning along the optimal ratio curve; and
        providing the one or more images for presentation through an interface.

9. The system of claim 8, wherein the optimal curve is determined as a curve that passes through the most energetic portions of the CFP gather spectrum.

10. The system of claim 8, wherein the CFP gather spectrum is determined based on a ratio of P wave velocity to S wave velocity.

11. The system of claim 8, wherein the one or more images include one or more PS wave images.

12. The system of claim 11, wherein the one or more PS wave images are correlated with one or more P wave images.

13. The system of claim 8, where generating the CFP gather spectrum employs P wave velocity.

14. The system of claim 8, wherein scanning along the optimal curve includes scanning along a single parameter that is a ratio of P wave velocity to S wave velocity.

15. One or more non-transitory computer-readable storage media storing instructions which, when executed by at least one processor, cause the at least one processor to perform operations comprising:
    receiving sensor data generated by one or more sensors through seismic probing of an underground environment, the sensor data including pressure (P) wave data;
    determining pressure-shear (PS) wave data present in the sensor data, wherein a PS wave includes a P wave as an incident wave and a shear (S) wave as a reflected wave;
    generating a common focus point (CFP) ratio spectrum based on a ratio of P wave velocity to S wave velocity;
    determining an optimal ratio curve through at least a portion of the CFP ratio spectrum;
    generating, by the at least one processor, one or more images of the underground environment by scanning along the optimal ratio curve; and
    providing the one or more images for presentation through an interface.

16. The one or more non-transitory computer-readable storage media of claim 15, wherein the optimal curve is determined as a curve that passes through the most energetic portions of the CFP gather spectrum.

17. The one or more non-transitory computer-readable storage media of claim 15, wherein the CFP gather spectrum is determined based on a ratio of P wave velocity to S wave velocity.

18. The one or more non-transitory computer-readable storage media of claim 15, wherein the one or more images include one or more PS wave images.

19. The non-transitory one or more computer-readable storage media of claim 18, wherein the one or more PS wave images are correlated with one or more P wave images.

20. The one or more non-transitory computer-readable storage media of claim 15, where generating the CFP gather spectrum employs P wave velocity.

* * * * *